United States Patent [19]
Mierendorf

[11] 3,842,329
[45] Oct. 15, 1974

[54] CONTROL FOR ELECTROMECHANICAL BRAKE HAVING TRANSISTORIZED TIMING RESET MEANS

[75] Inventor: Robert E. Mierendorf, Greendale, Wis.

[73] Assignee: Harnischfeger Corporation, W. Milwaukee, Wis.

[22] Filed: Nov. 12, 1973

[21] Appl. No.: 415,214

[52] U.S. Cl. .................................. 318/372, 317/154
[51] Int. Cl. ........................................... H01h 47/04
[58] Field of Search................... 318/364, 365, 372; 317/154

[56] References Cited
UNITED STATES PATENTS

| | | | |
|---|---|---|---|
| 3,270,265 | 8/1966 | McNulty | 318/372 |
| 3,577,040 | 5/1971 | Campbell | 317/154 X |
| 3,706,011 | 12/1972 | Vincent | 317/154 X |
| 3,786,314 | 1/1974 | Misch | 317/154 |

*Primary Examiner*—Robert K. Schaefer
*Assistant Examiner*—W. E. Duncanson, Jr.
*Attorney, Agent, or Firm*—James E. Nilles

[57] ABSTRACT

A static brake controller for an electromechanical brake initially supplies direct current voltage from a first bridge rectifier, energized from a power supply transformer, to the brake magnet coil to release the brake and then supplies reduced direct current voltage from second bridge rectifier, energized by a reduced voltage tap on the power supply transformer, to the brake magnet coil to maintain the brake released while preventing coil overheating. The first bridge rectifier has SCR's in the legs thereof and a relaxation oscillator energizable from the transformer and including a unijunction transistor and an emitter capacitor connected thereto, applies gating pulses to the SCR's to render them conductive. Oscillator disabling means, including a timing capacitor energizable from the transformer and dischargeable to operate a first transistor to short-circuit the emitter capacitor, are provided to disable the relaxation oscillator a predetermined interval of time after the power supply transformer is energized. A solid state logic reset circuit, including a normally reverse-biased transistor which becomes forwardly biased in response to deenergization of the power supply transformer, is provided to operate a second transistor which short-circuits the timing capacitor to effect reset thereof and to operate said first transistor which short-circuits the emitter capacitor to disable the relaxation oscillator.

10 Claims, 1 Drawing Figure

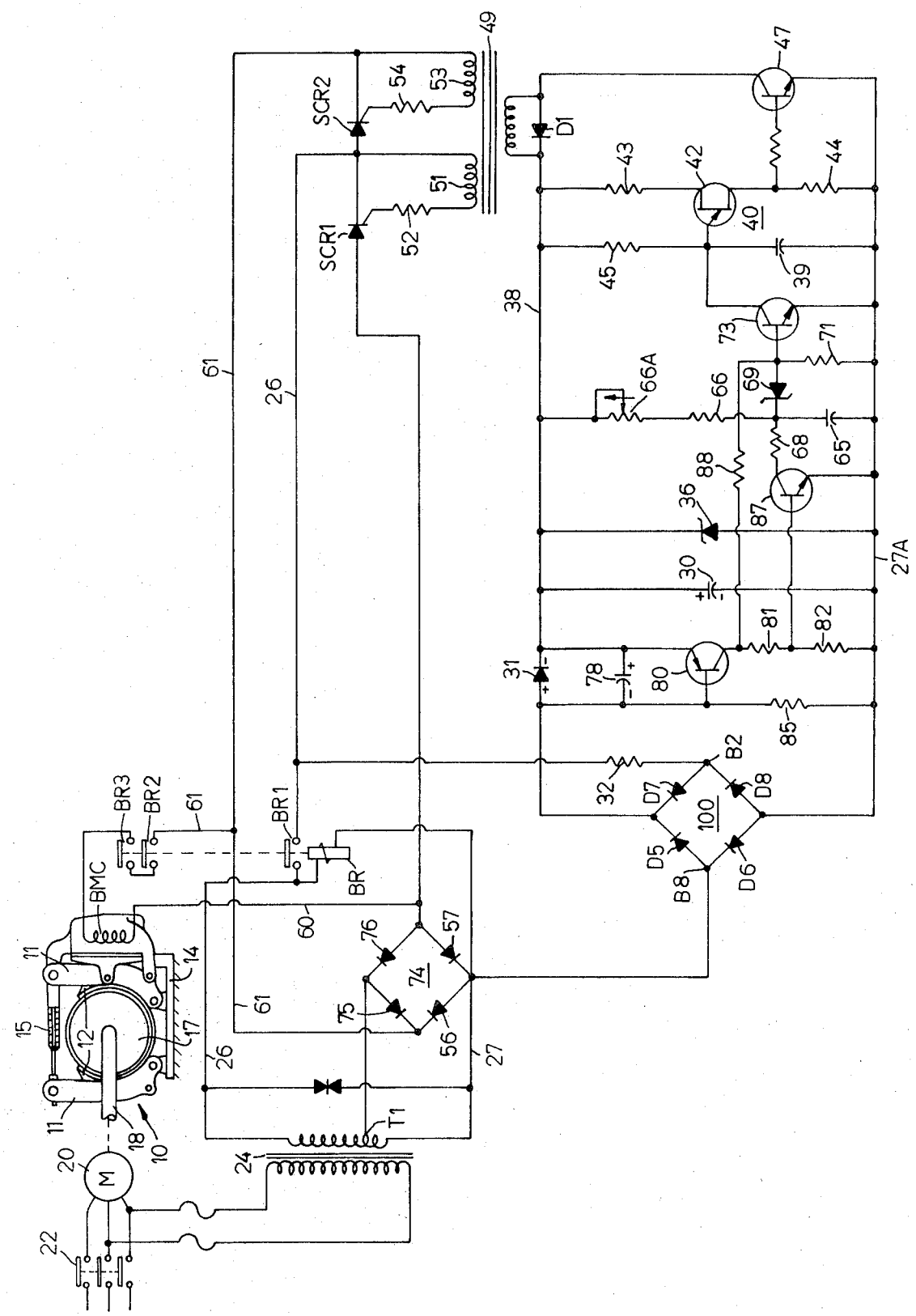

CONTROL FOR ELECTROMECHANICAL BRAKE HAVING TRANSISTORIZED TIMING RESET MEANS

BACKGROUND OF THE INVENTION

1. Field of Use

This invention relates to electronic controls for electromechanical brakes.

2. Description of the Prior Art

Direct current electromechanical brakes are frequently used to prevent rotation of the shaft of a crane hoist motor while the motor is de-energized and until the motor is energized to rotate the shaft. Typically, the brake comprises a pair of brake jaws carrying brake shoes that are urged by spring means against a brake wheel rigid with the motor shaft to set the brake, and a brake operating magnet having an armature operatively connected to a brake jaw is adapted to actuate the armature in a direction to relieve the spring pressure from the brake jaws, and thus release the brake, when the brake magnet coil is energized. The brake may be maintained in released condition for a substantial interval while the hoist motor shaft is being operated and the relatively high magnitude of current which is necessary to assure quick and uniform attraction of the brake armature may result in overheating of the brake coil and also prevent the brake from rapidly setting when the brake coil is de-energized.

Brake controllers are known having a first relay which is operated to connect a full-wave rectifier to the direct current brake magnet coil and a second relay which is operated after a time delay to transfer the bridge rectifier to a reduced voltage on the power supply transformer and thus reduce the brake coil current to a magnitude which will maintain the brake released. However, the sensitivity of such second relay often changes in the field during use, and if the second relay fails to pick up, full current is continuously applied to the brake magnet coil and may burn up the brake magnetic coil. Further, such prior art brake controllers necessitated field adjustment of relay sensitivity.

My U.S. Pat. No. 3,614,565 for "Control for Electromechanical Brake" issued Oct. 19, 1971 discloses a solid state control for an electromechanical brake which overcomes the aforesaid problems and initially supplies full dc power to the brake magnetic coil to accomplish quick release and then reduces the brake coil current after the brake releases to a holding current magnitude which minimizes brake coil heating and allows the brake to set more rapidly when the coil is de-energized.

In the circuit disclosed in my aforesaid patent, a first bridge rectifier having controlled rectifiers in legs thereof and energized from a power supply transformer is connected to apply full direct current voltage to the brake coil to release the brake. A second bridge rectifier energized from a reduced voltage tap on the power supply transformer is connected to apply normal holding voltage to the brake coil. Oscillator means energized from the power supply transformer supply gating pulses to the controlled rectifiers, and RC timing circuit means energized from the power supply transformer disable the oscillator means after a predetermined interval of time, whereby the controlled rectifiers are commutated off after said predetermined interval and the second bridge rectifier applies normal holding voltage to maintain the brake released and thus prevents over-heating of the brake coil.

To insure proper operation of my aforedescribed circuit, it is necessary that the voltage applied to the oscillator circuit be interrupted abruptly, so that the RC timing circuit means can be rapidly reset in readiness for the next braking operation. Therefore, that circuit employed an auxiliary contact operated by a brake relay coil which closed when the brake relay was de-energized to short circuit (i.e., discharge) the RC timing circuit capacitor to provide for rapid reset of the timing circuit. In some instances, after prolonged field use, the said auxiliary contact failed to close fully to complete the necessary short circuit and this resulted in a failure in resetting of the timing circuit.

SUMMARY OF THE INVENTION

In accordance with the present invention there is provided an electronic control for an electromechanical brake of the aforesaid character wherein the normally closed auxiliary contact which reset the timing circuit is eliminated and a solid state logic circuit is used in place thereof to effect resetting of the timing circuit and to effect disabling of the oscillator means in order to improve system reliability and reduce the cost of the controller.

In accordance with the invention, a static brake controller for an electromechanical brake initially supplies direct current voltage (i.e., 100 volts dc) from a first bridge rectifier, energized from a power supply transformer, to the brake magnet coil to release the brake and then, after a short interval (i.e., 1 second) supplies reduced direct current voltage (i.e., 10 volts dc) from second bridge rectifier, energized by a reduced voltage tap on the power supply transformer, to the brake magnet coil to maintain the brake released while preventing coil overheating. The first bridge rectifier has SCR's in the legs thereof and a relaxation oscillator energizable from the transformer and including a unijunction transistor and an emitter capacitor connected thereto, applies gating pulses to the SCR's to render them conductive. Oscillator disabling means, including a timing capacitor energizable from the transformer and dischargeable to operate a first transistor to short-circuit the emitter capacitor, are provided to disable the relaxation oscillator a predetermined interval of time after the power supply transformer is energized. A solid state logic reset circuit, including a normally reverse-biased transistor which becomes forwardly biased in response to deenergization of the power supply transformer, is provided to operate a second transistor which short-circuits the timing capacitor to effect reset thereof and to operate said first transistor which short-circuits the emitter capacitor to disable the relaxation oscillator.

DESCRIPTION OF A PREFERRED EMBODIMENT

The invention will be described with reference to an electromechanical brake 10 having a pair of brake jaws 11 carrying brakeshoes 12 and pivotally connected by pins to a base 14. The brake jaws 11 are normally urged by spring means 15 against a brake wheel 17 which is rigid with a motor shaft 18 to hold the shaft immobile when brake 10 is set. Shaft 18 may actuate the main hook of a crane (not shown) and is driven by a three-phase alternating current motor 20 when brake 10 is released and a contactor 22 is closed to energize motor 20 from a suitable three-phase alternating current power supply.

Closure of contactor 22 energizes the primary winding of a power supply transformer 24, and the 115 volt, 60 hertz potential on the secondary winding of transformer 24 appears across conductors 26 and 27 and energizes the operating coil of a relay BR. Relay BR comprises relay contacts BR2 and BR3 which close when relay BR is energized to energize the brake coil BMC and release the brake. Relay BR also comprises a relay contact BR1 which closes when relay BR is energized to apply an ac potential from the secondary winding of transformer 24 to the input terminals B2 and B8 of a full-wave rectifier bridge 100 to apply a dc potential on the conductors 38 and 27A connected to the output terminals of rectifier bridge 100. The direct current voltage on conductors 38 and 27A initiates charging of a capacitor 30 which is connected across conductors 38 and 27A.

The voltage on capacitor 30 appearing on conductor 38 initiates charging of the emitter capacitor 39 of a unijunction free-running, or relaxation oscillator 40 including a unijunction transistor 42 having its base-one and base-two connected through resistors 43 and 44 to conductors 38 and 27A, respectively. Emitter capacitor 39 of the unijunction oscillator 40 is charged through a resistor 45 by the direct current voltage on conductor 38, and when the charge on emitter capacitor 39 reaches the peak point voltage, the emitter of unijunction transistor 42 becomes forward biased, the dynamic resistance between the emitter and base-one drops to a low value, emitter capacitor 39 discharges through the emitter, and a current pulse flows in the emitter, base-one, and base-two circuits. The current pulse flowing through resistor 44 develops a voltage which forward biases the base of a transistor 47 and turns it ON. Current then flows from conductor 38 through the primary winding of an SCR triggering transformer 49 in series with the collector-emitter circuit of transistor 47 to conductor 27A. SCR triggering pulse transformer 49 has one secondary winding 51 connected in series with a resistor 52 and the gate-cathode circuit of a thyristor, or controlled rectifier SCR1 and another secondary winding 53 connected in series with a resistor 54 and the gate-cathode circuit of a thyristor, or controlled rectifier SCR2.

Thyristors SCR1 and SCR2 together with a pair of diodes 56 and 57 in bridge 74 comprise a full-wave rectifier bridge which is energized from the 115 volt alternating current potential appearing across conductors 26 and 27 and delivers approximately 100 volts dc to the brake magnet coil BMC of brake 10. Operation of relay BR from the ac voltage appearing across conductors 26 and 27 closes a first set of contacts BR1 of relay BR to connect conductor 26 to one side of the full-wave rectifier bridge at the junction of thyristors SCR1 and SCR2, and the other side of the rectifier bridge at the junction of diodes 56 and 57 is connected to conductor 27. One side of brake magnet coil BMC is connected by lead 60 to one dc terminal of the bridge rectifier 74 and operation of relay BR closes its sets of controls BR2 and BR3 to connect brake magnet coil BMC over conductor 61 to the other dc terminal of the bridge rectifier 74.

The voltage induced in secondary windings 51 and 53 of SCR triggering transformer 49 when transistor 47 conducts results in application of gating signals to thyristors SCR1 and SCR2 so that the bridge rectifier delivers full dc current to brake magnet coil BMC. Energization of brake coil BMC attracts the brake magnet armature 63 which is operatively connected to one of the brake jaws 11 and releases the pressure of spring 15, thereby releasing brake 10 and permitting motor 20 to rotate shaft 18. Unijunction relaxation oscillator 40 continues to deliver current pulses which are coupled through transistor 47 and SCR triggering transformer 49 to gate-controlled rectifiers SCR1 and SCR2.

Gating signals are removed from controlled rectifiers SCR1 and SCR2 a predetermined interval after initial energization of power supply transformer 24 to disconnect full operating voltage from brake magnet coil BMC and to apply normal holding voltage to brake coil BMC. Such predetermined interval is of sufficient duration to insure release of brake 10, for example, 1 second. A timing capacitor 65 of an RC timing circuit is charged through a timing resistor 66 in series with adjustable resistor 66A across conductors 38 and 27A. The charge on timing capacitor 65 builds up after said predetermined interval to a sufficiently high voltage to break down a zener diode 69 and apply voltage across resistor 71. The voltage across resistor 71 forward biases the base of an NPN transistor 73 and turns it ON to short circuit the emitter of unijunction transistor 42 to conductor 27A, thereby turning the relaxation oscillator 40 off and stopping the gating pulses to thyristors SCR1 and SCR2. The thyristors SCR1 and SCR2 turn off at current zero and thus remove the 100 volt dc output voltage of the bridge rectifier from the brake magnet coil BMC.

The ac terminals of the second full-wave bridge rectifier 74 comprising diodes 56 and 57 and two diodes 75 and 76 are connected across a reduced voltage tap T1 on the secondary winding of power supply transformer 24 and conductor 27 so that sufficient ac voltage, for example 14 volts, is impressed across bridge rectifier 74 to maintain brake 10 released. One dc terminal of bridge rectifier 74 is connected over lead 60 to the brake magnet coil BMC, and the other dc terminal of bridge rectifier 74 is connected over conductor 61 and relay BR contacts BR2 and BR3 to the other side of brake magnet coil BMC. Bridge rectifier 74 may deliver normal brake holding voltage to the brake coil BMC, thus holding brake 10 released but minimizing heating of brake coil BMC. The reduced, or holding current to brake coil BMC also assures rapid resetting of brake 10 when contactor BR is opened.

With an ac voltage applied between terminals B2 and B8, and dc voltage on conductors 38 and 27A, conduction takes place through a resistor 32, through diode D7 of bridge 100, diode 31, zener diode 36 and diode D6. On alternate cycles the path of conduction is through D5 of bridge 100, diode 31, zener diode 36, diode D8 and resistor 32. This results in a capacitor 30 charging to the zener diode voltage level. This voltage is limited by zener diode 36. When voltage appears across capacitor 30, free-running unijunction oscillator 42 starts, generating pulses across resistor 44 at a frequency of approximately 1,200 hertz. These pulses are amplified by transistor 47 and reflected to thyristors SCR1 and SCR2 through pulse transformer 49.

The voltage across capacitor 30 also causes current flow through timer capacitor 65 and timer resistors 66 and 66A, thereby charging capacitor 65. When timer capacitor 65 charges to approximately 10 volts, zener diode 69 breaks-over resulting in the turn-on of transistor 73. The turn-on of transistor 73 terminates the oscillations and, therefore, the SCR gating pulses. Normally the unijunction transistor 42 is allowed to oscillate for about 1 second. This time may be adjusted by rotation of timer resistor 66A.

A transistor 80 connected across conductors 38 and 27A in series with resistors 81 and 82 is reversed biased by the current through diode 31. This causes a capacitor 78 connected across the emitter and base of transistor 80 to charge to a voltage of 0.5 volts with a polarity opposite to that shown on the drawing. This reverse bias holds transistor 80 off during those periods of time when the sinusoidal ac supply voltage passes through zero.

When ac voltage is removed (goes to zero) from conductors 26 and 27, capacitor 30 discharges from 38, through the emitter-base of transistor 80 and through a resistor 85 to conductor 27A. This results in a polarity reversal of voltage on capacitor 78 and the turn-on of transistor 80 after a delay of approximately 3 milliseconds. Transistor 80 turns-on a transistor 87 which discharges timing capacitor 65 through resistor 68, and transistor 87 to conductor 27A. Simultaneously, transistor 80 supplies base current to transistor 73 through resistor 88. This insures that oscillations and SCR firing will not occur as the brake relay BR is opening, since the electronics is very fast (the total reset time is approximately 20 milliseconds) and the relay contact BR1 may arc because of the inductive load. To insure proper operation the ac voltage applied to resistor 32 and rectifier bridge 100 by conductors 26 and 27 must always be broken abruptly.

From the foregoing, it is apparent that the zener diode 36 effects resetting of the timing circuit. For example, considering a typical sine wave as having a time interval of 0.008 seconds for each portion of the wave, the break-over point of the zener diode 36 causes diode 31 to reverse bias transistor 80 so that capacitor 78 will have a reverse polarity and hold transistor 80 in a non-conductive state. Capacitor 78 maintains the reverse bias on transistor 80 for a normal interval of time when the ac voltage, or the rectified bridge voltage is less than that of zener diode 36. Thus, if the ac power is removed for an interval greater than 3 milliseconds, then capacitor 30, which is charged to approximately 15 volts, discharges back through transistor 80 and resistor 85 resulting in the turn-on of transistors 80 and 87 and the latter discharges the timing capacitor 65 to rapidly reset the timing cycle such that it is ready to oscillate for a full 1 second the next time ac power is applied.

It is to be noted that the electronics, namely, capacitor 30, capacitor 78, resistor 85, and transistor 80, respond so fast that it is possible to feed the second input back to transistor 73 through resistor 88 to prevent the oscillator 40 from restarting prior to completely breaking the highly inductive brake coil load BMC by the electromechanical contacts BR2 and BR3.

The 3 millisecond delay in turning on transistor 80 may be readily varied by changing capacitor 78 or resistor 85.

The total reset time of 20 milliseconds is controlled by the current capability of transistor 87. The capacitor discharge current through transistor 87 is limited by resistor 68 and, therefore, governed by the RC time constant or resistor 68 and capacitor 65.

RESUME

There is provided a static brake controller for an electromechanical brake 10 having a brake coil BMC energizable to release the brake. A power supply transformer 24 having a reduced voltage tap T1 on a secondary winding thereof is also provided. The controller comprises a first full-wave rectifier having a controlled rectifier SCR in at least one leg thereof and connected to be energized from the secondary winding to apply direct current voltage to the brake coil BMC to release the brake. A second full-wave rectifier is connected to be energized from the reduced voltage tap T1 on the secondary winding to apply a reduced direct current voltage to the brake coil BMC to hold the brake released. Rectifying means 100 are connected to be energized from the secondary winding. Switch means BR1 for connecting and disconnecting the SCR's is also responsive to energization and de-energization of brake coil BMC for connecting and disconnecting the rectifying means 100 to the secondary winding. Relaxation oscillator means 40 energizable from the rectifying means 100 and comprising a unijunction transistor 42 are operable to apply gating pulses to turn on the SCR's and an emitter capacitor 39 connected to the emitter of the unijunction transistor 42 is chargeable to forwardly bias the unijunction transistor 42 for operation. Oscillator disabling means energizable from the rectifying means 100 and comprising a first transistor 73 are connected to the emitter capacitor 39 and are operable when turned on to short-circuit said emitter capacitor 39 and disable said unijunction transistor 42. The oscillator disabling means further comprise a timing capacitor 65 which is connected to the base of the first transistor 73 and chargeable from said rectifying means 100. The timing capacitor 65 is dischargeable after a predetermined interval of time to turn on the first transistor 73. The oscillator disabling means further comprise a second transistor 87 connected to the base of the timing capacitor 65 which is operable, when turned on, to short-circuit the timing capacitor 65. Reset means energizable from the rectifying means 100 comprise a third transistor 80 connected to the bases of the first transistor 73 and the second transistor 87 and is operable, when turned on, to turn on transistors 73 and 87 and thereby short-circuit the timing capacitor 65 and the emitter capacitor 39. The reset means further include a biasing capacitor 78 energizable from the rectifying means 100 and connected between the emitter and base of the third transistor 80 to reverse bias the third transistor 80 to off, until said rectifying means 100 are de-energized in response to de-energization of the power supply transformer and said brake coil, whereupon a capacitor 30 connected across the output of rectifying means 100 is able to forwardly bias said third transistor 80 to on.

I claim:

1. A static brake controller for an electromechanical brake having a brake coil energizable to release said brake, comprising: a first full-wave rectifier having a controlled rectifier in at least one leg thereof for applying a direct current voltage to said brake coil to release said brake; a second full-wave rectifier for applying a reduced direct current voltage to said brake coil to hold said brake coil released; means including a relaxation oscillator having a unijunction transistor and an emitter capacitor connected thereto, said unijunction transistor being actuatable for applying gating pulses to said controlled rectifier to effect release of said brake, said means further comprising a first transistor for controlling said emitter capacitor; oscillator disabling means including a timing capacitor dischargeable a predetermined interval after said relaxation oscillator is actuated to disable said relaxation oscillator, said oscillator disabling means further including a second transistor for controlling said timing capacitor, whereby said controlled rectifier is deactuated and said second full-wave rectifier applies said reduced direct current voltage to said brake coil to maintain said brake released; and reset means operable upon deenergization of said brake coil to operate said second transistor to short-circuit said timing capacitor and thereby reset the timing circuit means and to operate said first transistor to short-circuit said emitter capacitor to disable said relaxation oscillator.

2. A static brake controller for an electromechanical brake having a brake coil energizable to release said brake and a power supply transformer having a reduced voltage tap on a secondary winding thereof, comprising: a first full-wave rectifier having a controlled rectifier in at least one leg thereof and connected to be energized from said secondary winding to apply direct current voltage to said brake coil to release said brake; a second full-wave rectifier connected to be energized from said reduced voltage tap on said secondary winding to apply a reduced direct current voltage to said brake coil to hold said brake coil released; rectifying means connected to be energized from said secondary winding; switch means for connecting and disconnecting said rectifying means to and from said secondary winding upon energization and deenergization, respectively, of said brake coil; means including a relaxation oscillator for applying gating pulses to said controlled rectifier to effect release of said brake, said relaxation oscillator including a unijunction transistor and an emitter capacitor coupled to the emitter of said unijunction transistor and adapted to be charged by said rectifying means; oscillator disabling means including a timing capacitor dischargeable a predetermined interval of time after it is charged by said rectifying means for disabling said relaxation oscillator, whereby said controlled rectifier is turned off and said second full-wave rectifier applies said reduced direct current voltage to said brake coil to maintain said brake released; said oscillator disabling means further including a first transistor which turns on in response to a predetermined voltage build-up across said timing capacitor to short-circuit said emitter capacitor and thereby turn off said unijunction transistor to disable said relaxation oscillator; and reset means including a second transistor which turns on to short-circuit said timing capacitor and a third transistor for controlling said first and second transistors, said reset means further including means to normally bias said third transistor to off and responsive to disconnection of said rectifying means to turn on said second transistor to short-circuit said timing capacitor to effect reset thereof and to turn on said first transistor to effect short-circuiting of said emitter capacitor and thereby disable said relaxation oscillator.

3. A static brake controller according to claim 2 wherein said reset means further includes a biasing capacitor connected between the emitter and the base of said third transistor for maintaining said third transistor biased off until disconnection of said rectifying means effects turn on of said third transistor.

4. A static brake controller according to claim 3 including a capacitor connected across the output terminals of said rectifying means and chargeable upon connection of said rectifying means to said secondary winding, said capacitor being dischargeable upon disconnection of said rectifying means from said secondary winding to effect forward biasing and turn on of said third transistor.

5. A static brake controller in accordance with claim 4 including a brake relay having a first set of normally open contacts adapted when closed to connect said first full-wave bridge rectifier to said brake coil.

6. A static brake controller in accordance with claim 5 wherein said brake relay has a second set of normally open contacts adapted when closed to connect said power supply transformer secondary winding to said first full-wave bridge rectifier.

7. A static brake controller in accordance with claim 6 wherein said brake relay has an operating coil connected to be energized from the secondary winding of said power supply transformer.

8. A static brake controller in accordance with claim 4 wherein said first and second full-wave rectifiers are bridge rectifiers and a pair of diodes is common to both said rectifiers, said first bridge rectifier has a pair of SCR's in legs thereof, and said means for applying gating pulses supplies trigger pulses to both of said SCR's and includes a trigger pulse transformer having its primary winding coupled to said relaxation oscillator and having a pair of secondary windings each of which is coupled to the gate-cathode of one of said SCR's.

9. A static brake controller in accordance with claim 8 wherein said timing capacitor is connected in series with a timing resistor and a rectifier across said rectifying means.

10. A static brake controller in accordance with claim 9 including a zener diode coupled to said timing capacitor for forward biasing the base of said first transistor to on in response to a predetermined voltage build up across said timing capacitor.

* * * * *